(12) United States Patent
Stadermann et al.

(10) Patent No.: US 6,998,080 B2
(45) Date of Patent: Feb. 14, 2006

(54) METHOD FOR MANUFACTURING A FILTER BODY

(75) Inventors: Gabriele Stadermann, Berlin (DE); Karl-Heinz Kohricht, Berlin (DE)

(73) Assignee: MSA Auer GmbH, Berlin (DE)

( * ) Notice: Subject to any disclaimer, the term of this patent is extended or adjusted under 35 U.S.C. 154(b) by 540 days.

(21) Appl. No.: 10/114,623

(22) Filed: Apr. 2, 2002

(65) Prior Publication Data

US 2004/0046289 A1 Mar. 11, 2004

(30) Foreign Application Priority Data

Apr. 3, 2001 (DE) ................ 101 17 435

(51) Int. Cl.
*B29C 43/02* (2006.01)
(52) U.S. Cl. .............. 264/122; 264/DIG. 48; 55/DIG. 5
(58) Field of Classification Search ........... 264/122, 264/DIG. 48; 55/DIG. 5
See application file for complete search history.

(56) References Cited

U.S. PATENT DOCUMENTS

| | | | | |
|---|---|---|---|---|
| 3,485,909 A | * | 12/1969 | Yagishita | 264/122 |
| 6,004,495 A | * | 12/1999 | Keibel | 264/122 |
| 6,083,439 A | * | 7/2000 | Nastke et al. | 264/122 |
| 6,368,504 B1 | * | 4/2002 | Kuennen et al. | 210/315 |
| 6,669,881 B2 | * | 12/2003 | Saier | 264/126 |
| 6,712,939 B2 | * | 3/2004 | Chen et al. | 162/218 |

* cited by examiner

*Primary Examiner*—Mary Lynn Theisen
(74) *Attorney, Agent, or Firm*—Welsh & Katz, Ltd.

(57) ABSTRACT

The first step of a method for manufacturing polymer-bonded filter bodies is to produce a mixture of a sorptive agent, a liquid, and a polymer. This mixture is then pressed into a filter body by being placed in a compression mold and simultaneously applying a hot gas to it. The evaporation temperature of the liquid is lower than the melting temperature of the polymer while the temperature of the hot gas flowing through the mixture exceeds the evaporation temperature of the liquid. This inexpensive method can provide homogeneously structured high-performance filter bodies.

11 Claims, No Drawings

METHOD FOR MANUFACTURING A FILTER BODY

This invention relates to a method for manufacturing filter bodies in which a mixture of a fine-grain meltable polymer and a material with a sorptive and/or catalytic effect is pressed into a polymer-bonded molded piece by applying pressure and heat.

A similar method is known, for example, from DE 197 14 350 A1. In accordance with this procedure, a fine-particle, preferably low-density polyethylene is intensely intermixed with an amino resin precondensate. Subsequently, a granular material with an adsorptive, absorptive, chemisorptive, or catalytic effect such as active charcoal is added to the reaction mixture thus obtained and intensely intermixed with it. The resulting mixture is finally filled into a mold and pressed into a molded piece using a compression mold at a temperature in the range from 90° C. to 180° C. and a pressure in the range from 0.0125 to 0.25 bar/cm$^2$. The low-density polyethylene has a low melting point and causes a firm mechanical bonding of the grains of active material. At the same time, the active surface of the active material is covered to a minimum only. The amino resin precondensate used as a binding agent helps to distribute the thermoplastic polymer in the active material and to improve the adhesion of the polymer to the active material while wetting it to a minimum only. When heat is applied, the polyethylene melts and forms polymer bridges between the active material grains while the amino resin component is foamed, wetted, and cured forming open-cell, foam-like polymers with good sorption properties.

Producing filter bodies in accordance with the method described above may prove difficult, however, as the mixture of active material, polyethylene, and resin cannot be poured readily enough so that it takes some effort to charge the mold portion by portion. In addition, an even distribution of the mixture in the compression mold cannot be guaranteed. Furthermore, an additional effort is required in that the amino resin precondensate has to be produced or provided as an adhesive agent. Inhomogeneities may occur due to partial demixing when filling the mixture into the mold and the resulting uneven heating. Another disadvantage of filter bodies manufactured using the method described above, especially when these products are to be used as respiration filters, is that the resin used produces an unpleasant odor that can only be removed by air-cleaning the filter material.

It is therefore the problem of this invention to provide a method for manufacturing a filter body from a polymer-bonded granular material with a sorptive and/or catalytic effect that can be carried out at low cost and is capable of providing highly sorptive filter bodies by a homogeneous mixture and distribution of heat and a gentle heat treatment when melting the polymer.

In other words, the major idea of the invention is that, in a first step, a liquid with an evaporation temperature no greater than the melting temperature of the polymer used is added to the sorptive material which is then mixed with the polymers to become a homogeneous pulp that can be poured easily. In the subsequent step, the material prepared as described is filled in a continuous flow into a compression mold. Finally, a hot stream of gas is applied to the mixture through the compression mold during pressing. This stream of gas passes through the mixture at a temperature that is higher than the evaporation temperature of the liquid medium.

Unlike the method known from DE 197 14 350 A1, addition of an evaporable liquid medium provides a homogeneous raw material that can be poured without any restriction, filled continuously into a compression mold, and will evenly distribute in this mold, which is required for achieving a homogeneous structure of the filter body without any demixing.

When blowing hot gas through the mixture during molding, the liquid adsorbed to the sorptive material evaporates and hot vapor can act on the polymers at a constant temperature, which means that the heat is distributed evenly and there is no overheating of individual sections. The liquid that was added and adsorbed to the sorptive material, or rather the vapor it forms, acts as a pore blocker or buffer between the polymers and the sorptive material so that only narrow polymer bridges are formed among grains of sorptive material while most of its pores remain free. In this way, most of the sorptive surface becomes available for adsorption and for absorbing harmful substances contained in the gas to be filtered.

Thus a method for producing filter bodies from a polymer-bonded granular material with a sorptive effect is disclosed that can be carried out at lower expenditure than the methods representing the state of the art and that provides homogeneous and highly sorptive filter bodies consisting just of the filter material and the polymers. Furthermore, no effort is required to remove any unpleasant odors that occur in the filter bodies manufactured according to the state-of-the-art method described at the outset. In principle, however, the method of the invention can be carried out as described in the characteristics of claim 9, i.e. without using a liquid medium.

Thus in a particularly preferred embodiment of this invention, the mixture for manufacturing the filter bodies filled into the compression mold consists of 70 parts of active charcoal, 30 parts of water, and 5 parts of a fine-particle polyethylene with a melting point of approx. 105° C. while the gas blown through the mixture in the compression mold is air at a temperature in the range from 125 to 165° C.

The invention is described in greater detail based on an embodiment thereof below:

First, a homogeneous free-flowing mixture is produced in a suitable mixing apparatus from active charcoal with a grain size of 1 to 2 mm to which water has been added in a preceding step, said water being adsorbed to the active charcoal, and polyethylene powder with a grain size of approximately 0.5 mm. The mixing ratio of active charcoal, water, and polyethylene is 70:35:5. This mixture is then directly filled into a compression mold shaped to form a filter body. The good pourability of the mixture ensures continuous and evenly distributed charging across the entire cross-section of the compression mold without requiring additional processing. During the subsequent pressing operation at pressures in the range from 5 to 30 bar/cm$^2$, hot air at a temperature in the range from 125 to 165° C. is blown via the compression mold through the mixture contained in the mold. In this process, the polyethylene particles melt and form polymer bridges between the active charcoal particles so that a mechanically stable molded piece becomes available after cooling and removal from the mold.

Uniform intermixing and an even distribution of particles as well as excellent free-flowing properties are ensured by the water portion adsorbed to the active charcoal. The hot air supplied as a heat source via the compression mold ensures homogeneous and gentle heating-up of the material in the mold and eliminates the risk of partial overheating. The water has a decisive function in supplying heat to the polyethylene grains as well, as it serves as a heat transfer medium while being evaporated in even distribution throughout the mixture due to adsorption to the charcoal particles by the hot air supplied, so that the resulting water vapor acts on all polyethylene particles at a virtually uniform temperature. This means that the heat is indirectly transferred to the polyethylene particles via the water vapor produced at a uniform temperature. At the same time the water, or the water vapor generated therefrom, acts as a buffer between active charcoal grains and polyethylene particles so that the molten polyethylene just forms polymer bridges among active charcoal particles and most of the active charcoal particle surface is available for sorptive or, if required, catalytic processes.

In accordance with the embodiment of the invention described, non-impregnated active charcoal was used as a sorptive material. However, active charcoal impregnated with a material that has a catalytic and/or chemisorptive effect as well as in principle any suitable sorptive material or a different polymer with similar properties to polyethylene can be used. The invention is not limited to the example described above in that another liquid medium with properties similar to water and/or a gaseous medium similar to air may be used instead of water or air, respectively, to supply heat for evaporation and to discharge liquid from the filter material.

We claim:

1. A method for producing a filter body in which a mixture of fine-grain meltable polymers and a granular material with a sorptive effect are pressed into a polymer-bonded molded piece by applying pressure and heat, characterized in that said mixture of said polymer and sorptive material is produced by adding a liquid medium, and in that a hot gaseous medium flows through said mixture in a compression mold causing substantially simultaneously a) said liquid medium to evaporate and be discharged and b) the polymer to melt, and in that the evaporation temperature of said liquid medium is not greater than the melting temperature of said polymer while the temperature of the supplied hot gaseous medium is above said evaporation temperature.

2. The method according to claim 1 characterized in that active charcoal is used as sorptive material and a fine-particle polyethylene is used for polymer bonding of the active charcoal while water is the liquid medium.

3. The method according to claim 2, characterized in that the mixing ratio is 50 to 90 parts of active charcoal, 15 to 50 parts of water, and 2 to 10 parts of polyethylene.

4. The method according to claim 3 wherein the mixing ratio of active charcoal, water, and polyethylene is 70:30:5.

5. The method according to claim 1, characterized in that first the liquid medium is added to said sorptive material and adsorbed to its surface, then the polymer is added.

6. The method according to claim 1 wherein air is used as the gaseous medium.

7. The method according to claim 6, characterized in that the temperature of the air supplied is in the range from 125° C. to 165° C.

8. The method according to claim 1, characterized in that said adsorptive and/or absorptive material is impregnated with a material that has a chemisorptive and/or cata-lytic effect.

9. A method for producing a filter body in which a mixture of a fine-grain meltable polymer and a granular material with a sorptive effect are pressed in to a polymer-bonded molded piece by applying pressure and heat, consisting essentilly of the steps of flowing a hot gaseous medium through said mixture of a polymer and sorptive material, thereby melting said polymer and applying pressure.

10. The method according to claim 9, characterized in that the temperature of the air supplied as a gaseous medium is in the range from 125° C. to 165° C.

11. The method according to claim 9, characterized in that said granular material is impregnated with a material that has a chemisorptive and/or catalytic effect.

* * * * *